US 8,989,777 B2

(12) United States Patent
Kim et al.

(10) Patent No.: US 8,989,777 B2
(45) Date of Patent: Mar. 24, 2015

(54) LOCATION SERVICE PROVIDING SYSTEM AND METHOD FOR PROVIDING TRIGGERED LOCATION REQUEST SERVICE

(75) Inventors: Joo-Young Kim, Suwon-si (KR); Hae-Young Jun, Anyang-si (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 1680 days.

(21) Appl. No.: 11/757,783

(22) Filed: Jun. 4, 2007

(65) Prior Publication Data

US 2007/0281662 A1    Dec. 6, 2007

(30) Foreign Application Priority Data

Jun. 3, 2006  (KR) .................. 10-2006-0050131
Aug. 11, 2006  (KR) .................. 10-2006-0076414

(51) Int. Cl.
*H04W 24/00*  (2009.01)
*H04W 4/02*  (2009.01)

(52) U.S. Cl.
CPC ..................... *H04W 4/02* (2013.01)
USPC ............. 455/456.2; 455/456.6; 455/456.5

(58) Field of Classification Search
CPC ......................................... H04W 4/02
USPC .................... 455/456.1–456.3, 456.5, 433
See application file for complete search history.

(56) References Cited

U.S. PATENT DOCUMENTS 6,750,812 B2 * 6/2004 Mizugaki et al. ........ 342/357.02
7,376,430 B2 * 5/2008 Matsuda .................... 455/456.2
7,558,696 B2 * 7/2009 Vilppula et al. ............. 702/150
2004/0259566 A1 * 12/2004 Maanoja et al. ........... 455/456.1
2005/0021769 A1 * 1/2005 Kim et al. .................... 709/228

(Continued)

FOREIGN PATENT DOCUMENTS

EP          1 443 791           8/2004
KR      1020050099625          10/2005

(Continued)

OTHER PUBLICATIONS

"Triggered Positioning Multiple Posmethod", Jun. 5, 2006.

(Continued)

*Primary Examiner* — Qun Shen
(74) *Attorney, Agent, or Firm* — The Farrell Law Firm, P.C.

(57) ABSTRACT

Disclosed are a location service providing system and a method for providing a triggered location request service. An H-SLP sets a priority order of a plurality of positioning methods which a target terminal supports according to a set priority order set condition and transmits priority order information according to respective positioning methods to the target terminal. Further, the target terminal may receive information about the positioning methods including the priority order and select a positioning method having the highest priority order among the positioning methods, which can be used in its current electric wave environment. Moreover, the H-SLP and the target terminal may calculate a location of the target terminal according to a positioning method that the target terminal has selected. Accordingly, although it is difficult to calculate the location of the target terminal according to the positioning method that the target terminal has selected, a location service of the target terminal can be continuously provided.

19 Claims, 10 Drawing Sheets

(56) References Cited

U.S. PATENT DOCUMENTS

| | | | |
|---|---|---|---|
| 2005/0239480 A1* | 10/2005 | Kim et al. | 455/456.1 |
| 2006/0079249 A1* | 4/2006 | Shim | 455/456.1 |
| 2007/0037585 A1* | 2/2007 | Shim | 455/456.1 |
| 2007/0182547 A1* | 8/2007 | Wachter et al. | 340/539.13 |
| 2007/0275658 A1* | 11/2007 | Gaal et al. | 455/12.1 |

FOREIGN PATENT DOCUMENTS

| | | |
|---|---|---|
| RU | 2141738 | 11/1999 |
| RU | 2220513 | 12/2003 |
| RU | 2255433 | 6/2005 |
| WO | WO 96/13951 | 5/1996 |
| WO | WO 00/27117 | 5/2000 |
| WO | WO 02/03093 | 1/2002 |
| WO | WO 03/005750 | 1/2003 |
| WO | WO 03/107708 | 12/2003 |

OTHER PUBLICATIONS

"Secure User Plane Location Architecture", Draft Version 2.0, Open Mobile Allance, Mar. 7, 2006.

* cited by examiner

| Parameter | Presence | Values/description |
|---|---|---|
| Positioning Method | - | Describes the positioning method:<br>• A-GPS SET assisted only<br>• A-GPS SET based only<br>• A-GPS SET assisted preferred (A-GPS SET based is the fallback mode)<br>• A-GPS SET based preferred (A-GPS SET assisted is the fallback mode)<br>• Autonomous GPS<br>• AFLT<br>• Enhanced Cell/sector (Note: Cell-ID is considered as a subset positioning method of Enhanced Cell/sector. When a SET receives the eCID indicator the SET SHALL respond with the mandatory location identifier (lid) elements and the optional location identifier (lid) elements if these optional elements are supported by the SET. If these elements are sent by the SET the SLP MAY choose to utilise or ignore the elements in the position calculation.)<br>• EOTD<br>• OTDOA<br>• No position<br>During a particular Network Initiated SUPL session, if a particular Positioning Method has been desired by an SLP, and if the following SUPL POS INIT message shows support of that same Positioning Method, then this Method SHALL be used for that session. If the Positioning Method desired by the SLP is not supported by the SET (as indicated in SUPL POS INIT) then another mutually acceptable Positioning Method may be used by the SLP in the positioning session. Otherwise the SLP will respond to the SUPL POS INIT message with a SUPL END message with the status code posMethodMismatch and terminate the session.<br>During a particular SET Initiated SUPL session, the Positioning Method parameter is used by the SLP to indicate the Positioning Method that SHALL be used for that session.<br>The positioning method "no position" is used when no SUPL POS session is to be conducted and the SUPL INIT message was sent for notification and verification purposes only. The SET will then respond with a SUPL END message including the appropriate status code ("consentDeniedByUser" or "consentGrantedByUser"). In case no verification was required ("notification only"), the SET will respond with a SUPL END message containing no status code.. |

FIG.2

(PRIOR ART)

| PARAMETER | PRESENCE | PRIORITY | VALUE |
|---|---|---|---|
| POSMETHOD_LIST | M | 1 | POSITIONING METHOD |
| | O | 2 | POSITIONING METHOD |
| | O | .... | .... |
| | O | N | POSITIONING METHOD |

M : MANDATORY
O : OPTIONAL

FIG.4

LOCATION SERVICE PROVIDING SYSTEM AND METHOD FOR PROVIDING TRIGGERED LOCATION REQUEST SERVICE

PRIORITY

This application claims priority under 35 U.S.C. §119(a) of to a Korean Patent Application entitled "Location Service Providing System And Method For Providing Triggered Location Request Service" filed in the Korean Intellectual Property Office on Jun. 3, 2006 and assigned Serial No. 2006-50131 on Aug. 11, 2006 and assigned Serial No. 2006-76414, the contents of which are hereby incorporated by reference.

BACKGROUND OF THE INVENTION

1. Field of the Invention

The present invention relates to a location service providing system and a method thereof, and more particularly to a location service providing system and a method for providing a triggered location request service.

2. Description of the Related Art

With an increase in the demand for various types of location-based location-relation services, various location services have been provided using the location of a mobile terminal, and development for extending the location services to mobile terminals has been achieved. Further, an extension of the location services is expected to be a base of a fourth generation communication service.

In recent years, a triggered location request service has been provided as a location service. In the triggered location request service, a location value of a target terminal periodically or a periodically repeats calculation. If the location value of the target terminal satisfies predetermined conditions, an occurrence fact of a corresponding event is provided to a secure user plane location agent.

A conventional triggered location request service providing method will be explained with reference to FIG. 1. FIG. 1 is a flow chart for describing the conventional triggered location request service providing method. Referring to FIG. 1, a Secure Plane Location Agent (referred to as 'SUPL AGENT' hereinafter) 104 requests a triggered location request service from a Home-SUPL Location Platform (H-SLP) 100 using a Mobile Location Protocol Triggered Location Reporting Request (MLP TLRR) in Step 106.

Next, when the H-SLP 100 receives an MLP TLRR message from the SUPL AGENT 104, it goes to Step 108 and judges routing information of a target terminal 102. That is, the H-SLP 100 judges whether the target terminal 102 is roaming and whether the target terminal 102 uses the SUPL.

According to a judgment result of the routing information of the target terminal, the H-SLP 100 goes to Step 110 and transmits a SUPL INITiation (INIT) message (initial location service request message) to the target terminal 102. Here, the SUPL INIT message includes SESSION_ID, which is an ID for discriminating a message exchange of the H-SLP 100 and the target terminal 102, a POSitioning METHOD (POS-METHOD) indicating a positioning method, a trigger type indicator, a proxy, and a non proxy mode indicator indicating a judgment condition of an occurrence or a non-occurrence of an event. In addition, the SUPL INIT message includes a Quality of Positioning (QoP) indicating a required measuring level of location information.

Furthermore, when the target terminal 102 receives the SUPL INIT message from the H-SLP 100, the target terminal 102 proceeds to Step 112 and determines if the H-SLP 100 is in a proxy mode. The target terminal 102 is connected to a data network such a packet data network or a circuit switched data network according to a check result of the proxy mode.

When the target terminal 102 is connected to the H-SLP 100 over the data network, it transmits a SUPL TRIGGERRED START message for starting the triggered location request service to the H-SLP 100 in Step 114. Here, the SUPL TRIGGERED START message includes SESSION_ID, (SUPL Enabled Terminal) SET capabilities, a hash of the received SUPL INIT message (ver), and a Location IDentifier (LID). The SESSION_ID is an identifier for discriminating a message exchange between the H-SLP 100 and the target terminal 102. The SET capabilities indicate a positioning capability. Here, the SET capabilities include a POS-METHOD information, namely, information about a SET-Assisted A-GPS (Assisted Global Positioning System) or a SET-Based A-GPS, information about associated positioning protocols such as a Radio Resource Location services Protocol (RRLP), Radio Resource Control (RRC), or a Telecommunication Industry Association (TIA)-801. FIG. 2 is a view showing an example of POSMETHOD information.

When the H-SLP 100 receives the SUPL TRIGGERED START message, it compares a location measuring capability with information included in the SET capabilities of the target terminal 102 and determines any one suitable positioning method according results of the comparison. Moreover, the H-SLP 100 goes to Step 116 and transmits a SUP TRIGGERED RESPONSET message (triggered location request service response message) including information about the determined positioning method to the target terminal 102. Next, the H-SLP 100 goes to Step 118 and informs the SUPL AGENT 104 using a Mobile Location Protocol Triggered Location Reporting Acquisition (MLP TLRA) that a request for triggered location request service has been received. Then, the H-SLP 100 transmits REQ_ID to be used as Transaction ID while the triggered location request service is being performed. Accordingly, the H-SLP 100 and the target terminal 102 can terminate a current data network connection.

Accordingly, the target terminal 102 goes to Step 120 and judges whether a transmission condition of location information is satisfied. Next, the target terminal 102 is again connected to the data network, when the information transmission condition is satisfied, and transmits a location information reporting message (SUPL POS REPORT message) in Step 122. Here, the SUPL POS REPORT message includes SESSION_ID and Location IDentifier (LID). Accordingly, the H-SLP 100 and the target terminal 102 go to Step 124 and calculates a location of the target terminal 102. The H-SLP 100 and the target terminal 102 go to Step 124 according to whether location information of the target terminal 102 according to the LID included in the SUPL POS REPORT message satisfies a set QoP and calculates a location of the target terminal 102 through the determined positioning method.

When the location of the destination 102 is calculated, the H-SLP 100 goes to Step 126 and reports the location of the target terminal 102 to the SUPL AGENT 104 using a Mobile Location Protocol Triggered Location Report (MLP TLREP) message. Next, when a performance condition of the triggered location request service that the SUP AGENT 104 requested is satisfied, for example, the target terminal 102 reaches a specific location or a set location service performance time is terminated, the H-SLP 100 and the target terminal 102 terminate the triggered location request service.

Accordingly, in the conventional triggered location request service providing method, an occurrence of an event that a location service requester, namely, a SUPL AGENT 104 requests is judged based on a set condition and a procedure for reporting an event occurrence result is repeatedly performed. Consequently, in the conventional triggered location request service providing method, when an H-SLP 100 selects any one from positioning methods included in SET Capabilities of a SUPL TRIGGERED START message in a start Step once, a location of a target terminal 102 is obtained by repeatedly using the same positioning method until the triggered location request service is terminated.

In the conventional method, a location is obtained only once in a conventional immediate service. However, in a case of the triggered location request service, a location should be periodically calculated for a long time such as 24 hours or 72 hours. This can change a situation of the target terminal. For example, while the target terminal 102 obtains a location using a Global Positioning System (GPS), it can be moved to a position in which a GPS signal is not received. Otherwise, while the target terminal 102 acquires a location using distance information, such as Time Difference Of Arrival (TDOA), from cellular Base Stations (BS), it receives distance information for adjacent cells less than 4 and become a state, which cannot use TDOA mode.

Accordingly, in such a case, in the conventional triggered location request service, when positioning method determined start Steps (Steps 114 and 116) of the triggered location request service cannot be used, the triggered location request service generates a positioning error and finishes the service. As a result, the SUPL AGENT 104 cannot receive the service for a required time.

SUMMARY OF THE INVENTION

Accordingly, the present invention has been made to solve the above-mentioned problems occurring in the prior art, and the present invention provides a location service providing system capable of continuously providing a triggered location request service, although a target terminal cannot use a determined positioning method because the target terminal moves to a different electric wave environment during an execution of the triggered location request service.

In accordance with an aspect of the present invention, there is provided a location information providing system including a location server for receiving information for location calculating methods which a target terminal of a location information providing service supports from the target terminal, transmitting at least one location calculating method to the target terminal, and selecting any one of the received positioning methods when information for at least available positioning method is received from the target terminal to calculate a location of the target terminal; and a target terminal for transmitting the information for the positioning methods capable of supporting to the location server, receiving the information for the at least one positioning method which the location server supports from the location server, extracting and transmitting positioning methods among the received information which can be used in a wave environment to the location server, and using a positioning method selected by the location server for providing a location service In accordance with another aspect of the present invention, there is provided a method for providing a location information providing service to a target terminal, the method including transmitting an initial location service request message to the target terminal by a location server; transmitting a location information providing service start message including information with respect to positioning methods that the target terminal supports to the location server by the target terminal in response to the initial location service request message; transmitting a location information providing service response message including information with respect to the positioning methods that the target terminal supports among the positioning methods including the location information providing service start message to the target terminal by the location server; selecting positioning methods being able to be used in a current electric wave environment of the target terminal among at least one positioning method included in the location providing service response message, and transmitting information with respect to the selected positioning methods to the location server by the target terminal; and selecting any one among the positioning methods received from the target terminal, and calculating a location of the target terminal according to the selected positioning method by the location server.

BRIEF DESCRIPTION OF THE DRAWINGS

The above and other aspects, features and advantages of the present invention will be more apparent from the following detailed description taken in conjunction with the accompanying drawings, in which:

FIG. 2 is a view showing an example of information about a positioning method and a parameter in a conventional triggered location request service;

FIG. 4 is a view showing an example of a POSMETHOD_list provided from an H-SLP according to an embodiment of the present invention;

DETAILED DESCRIPTION OF THE EXEMPLARY EMBODIMENT

Figure 1:
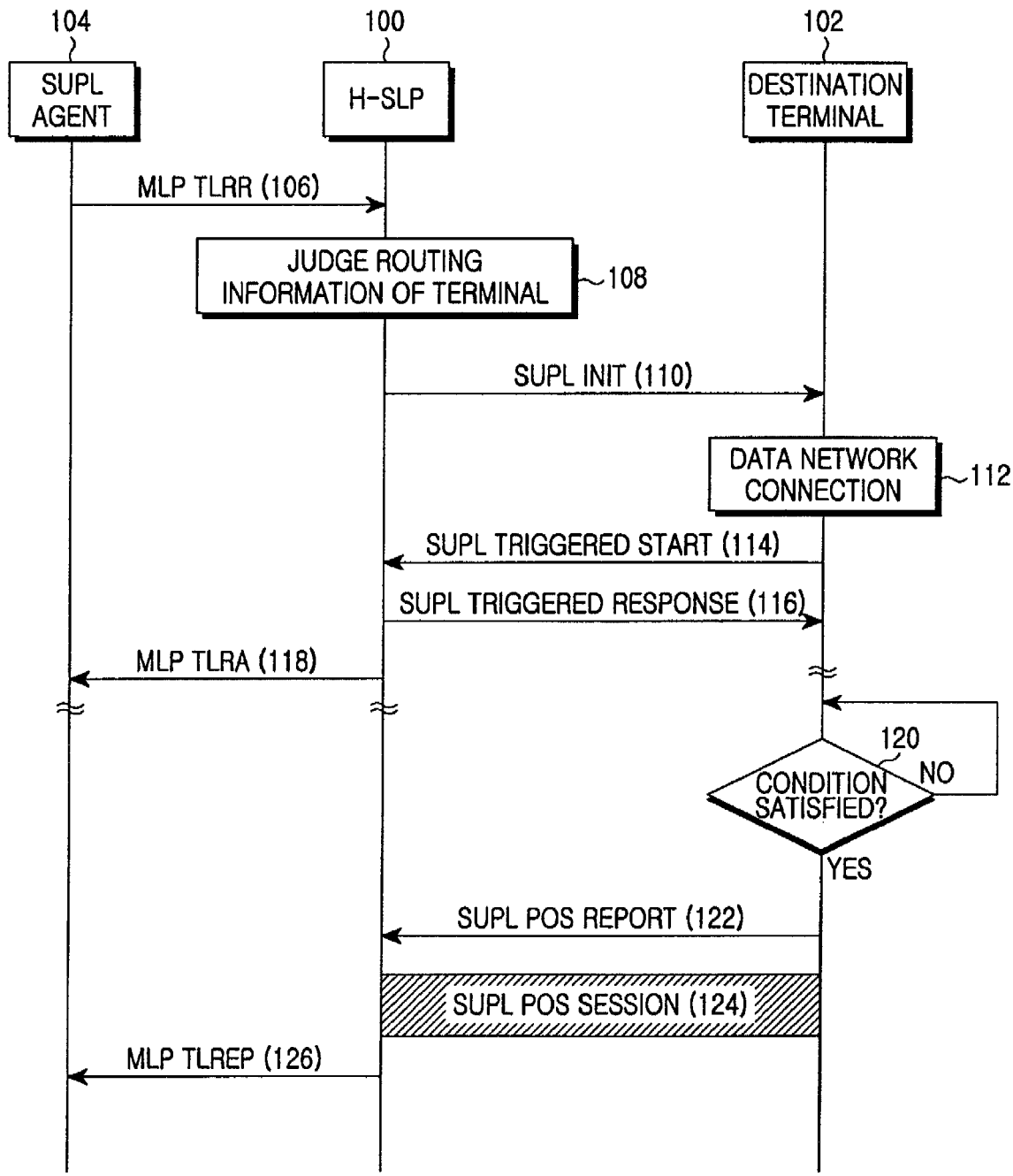
FIG. 1 is a flow chart for describing a conventional triggered location request service providing method.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

To facilitate a better understanding of the present invention, a basic principle thereof will now be explained. In the present invention, an H-SLP sets a priority order of a plurality of positioning methods which a target terminal supports according to a set priority order set condition, and transmits priority order information according to respective positioning methods to the target terminal. Further, the target terminal may receive information about the positioning methods including the priority order and select a positioning method having the highest priority order among the positioning methods, which can be used in its current electric wave environment. Moreover, the H-SLP and the target terminal may calculate a location of the target terminal according to a positioning method that the target terminal has selected. Accordingly, although it is difficult to calculate the location of the target terminal according to the positioning method that the target terminal has selected, a location service of the target terminal can be continuously provided.

Figure 3:
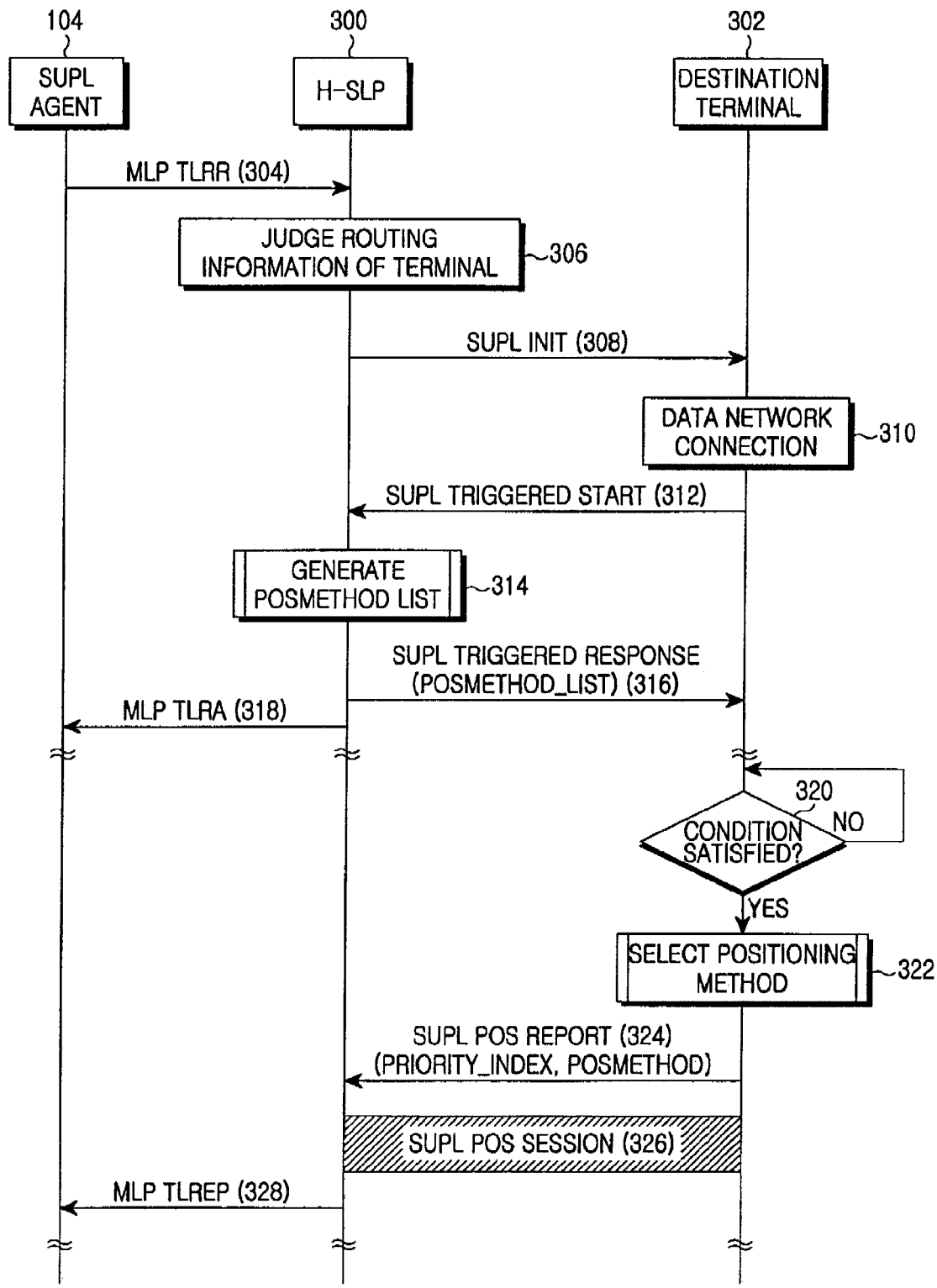
FIG. 3 is a flow chart illustrating a method for providing a triggered location request service in a location service providing system according to an embodiment of the present invention.

FIG. 3 is a flow chart illustrating a method for providing a triggered location request service in a location service providing system according to an embodiment of the present invention.

With reference to FIG. 3, in the location service providing system, when a SUPL AGENT 104 requests a triggered location request service from an H-SLP 300 using an MLP TLRR in Step 304, the H-SLP 300 judges routing information of the target terminal 302 (Step 306). Next, the H-SLP 300 transmits a SUPL INIT message to the target terminal 302 according to a judgment result of the routing information in the target terminal 302 (Step 308).

Subsequently, when the target terminal 302 receives the SUPL INIT message from the H-SLP 300, the target terminal 302 checks if the H-SLP 300 is in a proxy mode. The H-SLP 300 is connected to a data network such as packet data network or circuit switched data network in a manner according to a proxy mode check result.

Then, in Step 310, when the connection of the H-SLP 300 to the data network is terminated, the target terminal 302 goes to Step 312 and transmits a SUPL TRIGGERED START message for starting the triggered location request service to the H-SLP 300. Here, the SUPL TRIGGERED START message includes SESSION_ID, SET capabilities, a hash of the received SUPL INIT message(ver), and a Location Identifier (LID). The SESSION_ID is an identifier for discriminating a message exchange between the H-SLP 300 and the target terminal 302. The SET capabilities indicate a positioning capability. Here, the SET capabilities include positioning methods (POSMETHOD) and information about associated positioning protocols. FIG. 2 shows an example of POSMETHOD information.

In Step 312, when the H-SLP 300 receives the SUPL TRIGGERED START message, it selects positioning methods included in the SUPL TRIGGERED START message according to a set priority order set condition and sets a priority order (Step 314). Otherwise, the H-SLP 300 selects at least one positioning method with the terminal without the priority order. Here, the H-SLP 300 may select positioning methods among positioning methods included in a SET-capability of the terminal that the H-SLP 300 can provide. Further, the H-SLP 300 can select the positioning methods according to various conditions such as an enterpriser's preference, an enterpriser's billing policy, and quality of a service (in this case, precision of location value or a degree of a time taken to achieve a positioning method). Moreover, the H-SLP 300 can select the positioning methods in an order of the highest priority order according to a set priority order set condition.

Here, the set priority order set condition can be variously set according to service provider's policy, enterpriser's policy or user's selection. That is, for example, the priority order of the positioning methods can be determined based on precision, namely, QoP. Further, the priority order of the positioning methods may be determined according to a cost required or a time taken for the positioning of the target terminal 302. The H-SLP 300 sets a priority order of the positioning methods included in the SUPL TRIGGERED START message that the target terminal 302 can support.

When the priority order of the positioning methods is set, the H-SLP 300 generates a SUPL TRIGGERED RESPONSE message including priority order information and information about positioning methods corresponding to the priority order. Next, the H-SLP 300 goes to Step 316 and transmits the generated SUPL TRIGGERED RESPONSE message to the target terminal 302. Here, the priority order information and information about positioning methods corresponding to the priority order can be provided to the target terminal 302 in a list pattern POSMETHOD_list. In this case, as illustrated in Step 316 of FIG. 3, the SUPL TRIGGERED RESPONSE message including the POSMETHOD_list is transmitted to the target terminal 302.

FIG. 4 is a view showing an example of priority order information and information in a list pattern about the positioning methods included and provided in the SUP TRIGGERED RESPONSE message, namely, POSMETHOD_list provided from an H-SLP according to an embodiment of the present invention.

Next, the H-SLP 300 goes to Step 318 and informs the SUPL AGENT 104 that a request for the triggered location request service has been received through the MLP TLPA message. When the target terminal 302 receives the SUPL TRIGGERED RESPONSE message, it stores the positioning methods and priority order information corresponding to respective positioning methods including the SUPL TRIGGERED RESPONSE message. Accordingly, the H-SLP 300 and the target terminal 302 may terminate a current data network connection.

Then, the target terminal 302 goes to Step 320 and judges whether a location information transmission condition is satisfied. When the location information transmission condition is satisfied, the target terminal 302 goes to Step 322 and selects a positioning method having the highest priority order among the stored positioning methods. Further, the target terminal 302 checks whether the selected positioning method can be used according to a current selected positioning method. When the selected positioning method can be used, the target terminal 302 goes to Step 324 and transmits the SUPL POS REPORT message to the H-SLP 300. Here, priority order information PRIORITY_INDEX of the selected positioning method and information about a current selected positioning method are included in a SUPL POS REPORT message.

However, when an electric wave environment of the target terminal 302 cannot use the selected positioning method in Step 322, the target terminal 302 selects a positioning method having a next highest priority to a current selected positioning method among the stored positioning methods. Next, the target terminal 302 checks whether a current selected positioning method can be used according to the current selected positioning method.

Assuming that a positioning method having the highest priority order uses a GPS and a positioning method having a priority order next thereto uses TDOA, the target terminal 302 selects a positioning method having the highest priority order using the GPS. Next, the target terminal 302 checks transmission and receipt states of a current GPS signal and if the GPS signal is equal to or greater than a predetermined threshold value, which can be used in a positioning. When the GPS signal is equal to or greater than the predetermined threshold value, the target terminal 302 selects a positioning method using the GPS, and transmits information about a positioning method using the GPS and priority order information corresponding thereto to the H-SLP 300. Accordingly, the H-SLP 300 and the target terminal 302 go to Step 326 and calculate the location of the target terminal 302 according to the positioning method using the GPS. Subsequently, the H-SLP 300 goes to Step 328 and provides location information of the target terminal 302 to a SUPL AGENT 104.

In contrast to this, when the GPS signal is less than the threshold value, the target terminal 302 selects a positioning method having a next highest priority to a priority order corresponding to a current selected positioning method, namely, a positioning method using TDOA. Next, the target terminal 302 checks whether a current selected positioning method is a positioning method using the TDOA in a current electric wave environment, namely, whether there are at least three cell BSs capable of obtaining distance information. When a current electric wave environment of the target terminal 302 is suitable to use a positioning method using TDOA, the target terminal 302 selects the positioning method using the TDOA, and transmits information about the positioning method using the TDOA and priority order information corresponding thereto to the H-SLP 300. Accordingly, the H-SLP 300 and the target terminal 302 go to Step 326 and calculate the location of the target terminal 302 in the positioning method using the TDOA. Further, the H-SLP 300 goes to Step 328 and provides location information of the target terminal 302 to the SUPL AGENT 104.

Figure 5:
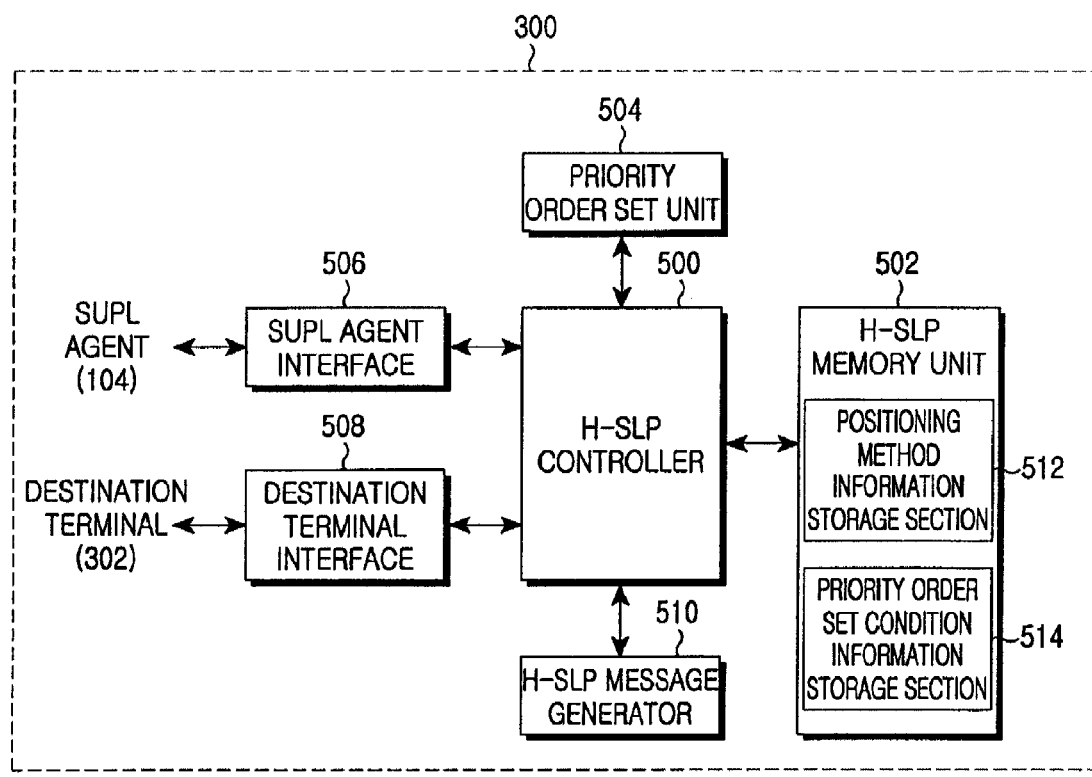
FIG. 5 is a block diagram showing a construction of the H-SLP in the location service providing system according to an embodiment of the present invention.

FIG. 5 is a block diagram showing a construction of the H-SLP 300 in the location service providing system according to an embodiment of the present invention.

With reference to FIG. 5, the H-SLP 300 according to an embodiment of the present invention includes an H-SLP controller 500, a priority order set unit 504, an HSL memory unit 502, an H-SLP message generator 510, a SUPL AGENT interface 506, and a target terminal interface 508, which are connected to the H-SLP controller 500.

The H-SLP controller 500 controls each structural element and a total operation of the H-SLP 300. In particular, when the SUPL AGENT 104 requests the triggered location request service from the H-SLP controller 500, the H-SLP controller 500 transmits a SUPL INIT message to the target terminal 302 so that it is understood which service the target terminal 302 starts. Here, the SUPL INIT message includes a parameter indicating that a request for the triggered location request service occurs.

When the H-SLP controller 500 receives information about positioning methods that the target terminal 302 can support from the target terminal 302, it selects one among the positioning methods and sets a priority order for respective positioning methods according to a set priority order set condition. Further, the H-SLP controller 500 transmits a SUPL TRIGGERED RESPONSE message to the target terminal 302. Here, the SUPL TRIGGERED RESPONSE message includes information about positioning methods in which a priority order is set.

Further, when a set condition according to a request for the triggered location request service from the SUPL AGENT 104 is satisfied, the H-SLP controller 500 receives information about positioning methods that the target terminal 302 can currently use. Also, the H-SLP controller 500 calculates the location of the target terminal 302 or transmits auxiliary location information, namely, Assistant Global Positioning System (A-GPS) information and orbit information of a satellite that can currently communicate to the target terminal 302, so that the target terminal 302 can calculate a location.

Furthermore, the H-SLP memory unit 502 connected to the H-SLP controller 500 includes a Read Only Memory (ROM), a flash memory, and a Random Access Memory (RAM). Among them, the ROM stores programs for a processing and a control of the H-SLP controller 500, and various types of reference data. The RAM provides a working memory of the H-SLP controller 500. The flash memory provides an area for storing various types of storage data, which can be upgraded. Further, the flash memory can have a storage area for storing information about positioning methods that the target terminal 302 may support when it receives the information from the target terminal 302. The flash memory may further have a storage area for storing priority order set condition information in order to set a priority order of the positioning methods received from the target terminal 302. Here, the priority order set condition information may be information that a designer, an enterpriser, or a user of the H-SLP 300 has set a priority order for a plurality of positioning methods according to respective priority order set condition (for example, a QoP preference or a cost preference). Accordingly, when the H-SLP controller 500 receives positioning methods that the target terminal 302 can support from the target terminal 302, it compares the positioning methods with the priority order set condition information to set a priority order between the two. Hereinafter, a storage area of the H-SLP memory unit 502 in which information about the positioning methods are stored is referred to as 'positioning method information storage section' 512. A storage area in which the priority order set condition information is stored is referred to as 'priority order set condition information storage section' 514.

Further, the priority order set unit 504 sets a priority order for the positioning methods received from the target terminal 302. Here, the priority order set condition can variously be set according to an enterpriser's policy or a user's selection, as described earlier.

Moreover, the H-SLP message generator 510 generates various messages to be transmitted to the SUPL AGENT 104 and the target terminal 302 under a control of the H-SLP controller 500. The messages include SUPL TRIGGERRED RESPONSE message. When positioning method information, a priority order of which is set from the H-SLP controller 500, is applied to the H-SLP message generator 510 through the priority order set unit 504, the H-SLP message generator 510 generates SUPL TRIGGERED RESPONSE message including the same. Here, the positioning method information a priority order of which is set can be included in the SUPL TRIGGERED RESPONSE message in POSMETHOD_list pattern. Further, the H-SLP message generator 510 applies the generated SUPL TRIGGERED RESPONSE message to the H-SLP controller 500 so that the H-SLP controller 500 can transmit it to the target terminal 302.

Furthermore, a SUPL AGENT interface 506 and a target terminal interface 508 provide an interface for exchanging various types of messages with the SUPL AGENT and an interface with the target terminal 302 to transmit various types of messages applied from the H-SLP controller 500 to the SUPL AGENT 104 or the target terminal 302.

Figure 6:
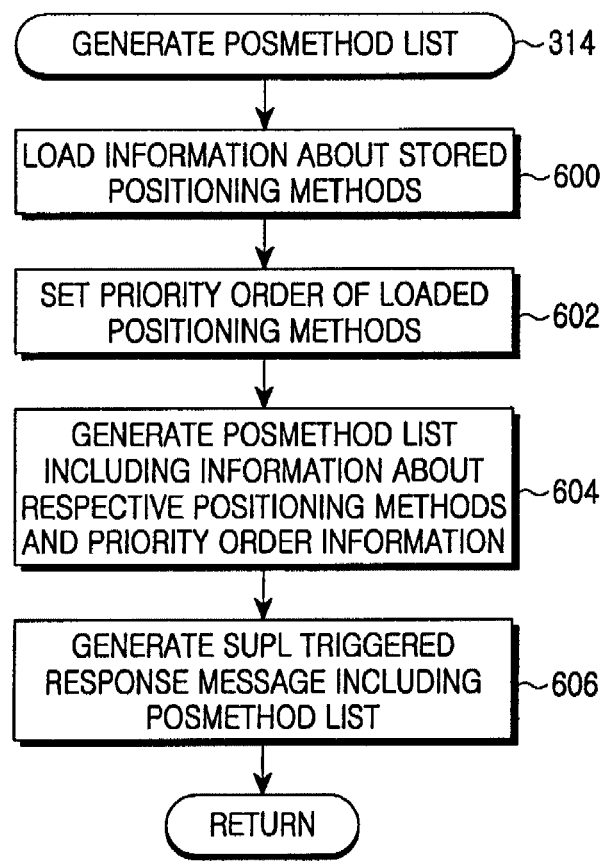
FIG. 6 is a flow chart showing an operation of generating POSMETHOD_list by the H-SLP when a SUPL TRIGGERED START message is received from a target terminal in the location service providing system according to an embodiment of the present invention.

FIG. 6 is a flow chart showing an operation of Step 314 of FIG. 3 generating POSMETHOD_list by the H-SLP when a SUPL TRIGGERED START message is received from a target terminal in the location service providing system according to an embodiment of the present invention. Hereinafter, as shown in FIG. 4, it is assumed that priority order information of respective positioning methods and information about positioning methods corresponding to a priority order are included in a SUPL TRIGGERED RESPONSE message, which is obtained by generating list pattern information, namely, POSMETHOD_list.

With reference to FIG. 6, when the H-SLP 300 receives the SUPL TRIGGERED START message from the target terminal 302, it goes to Step 600 and extracts information about positioning methods from the received SUPL TRIGGERED START message. Next, the H-SLP 300 goes to Step 602 and selects at least one positioning method, and sets a priority order of the positioning methods extracted in Step 600 according to a set priority order set condition through the priority order set unit 504.

Then, the H-SLP 300 goes to Step 604 and arranges information about the positioning methods extracted in Step 600 according to a corresponding priority order to generate POSMETHOD_list. The POSMETHOD_list includes information (for example, various types of parameters and description, values, etc.) about positioning methods and priority order information of the respective positioning methods that the target terminal 302 may support.

Subsequently, the H-SLP 300 goes to Step 606 and generates a SUPL TRIGGERED RESPONSE message including the POSMETHOD_list through the H-SLP message generator 510. Accordingly, the H-SLP 300 goes to Step 316 and transmits a SUPL TRIGGERED RESPONSE message including the POSMETHOD_list to the target terminal 302. Consequently, the target terminal 302 may identify a priority order set by the H-SLP 300 for the positioning methods that it can support.

Figure 7:
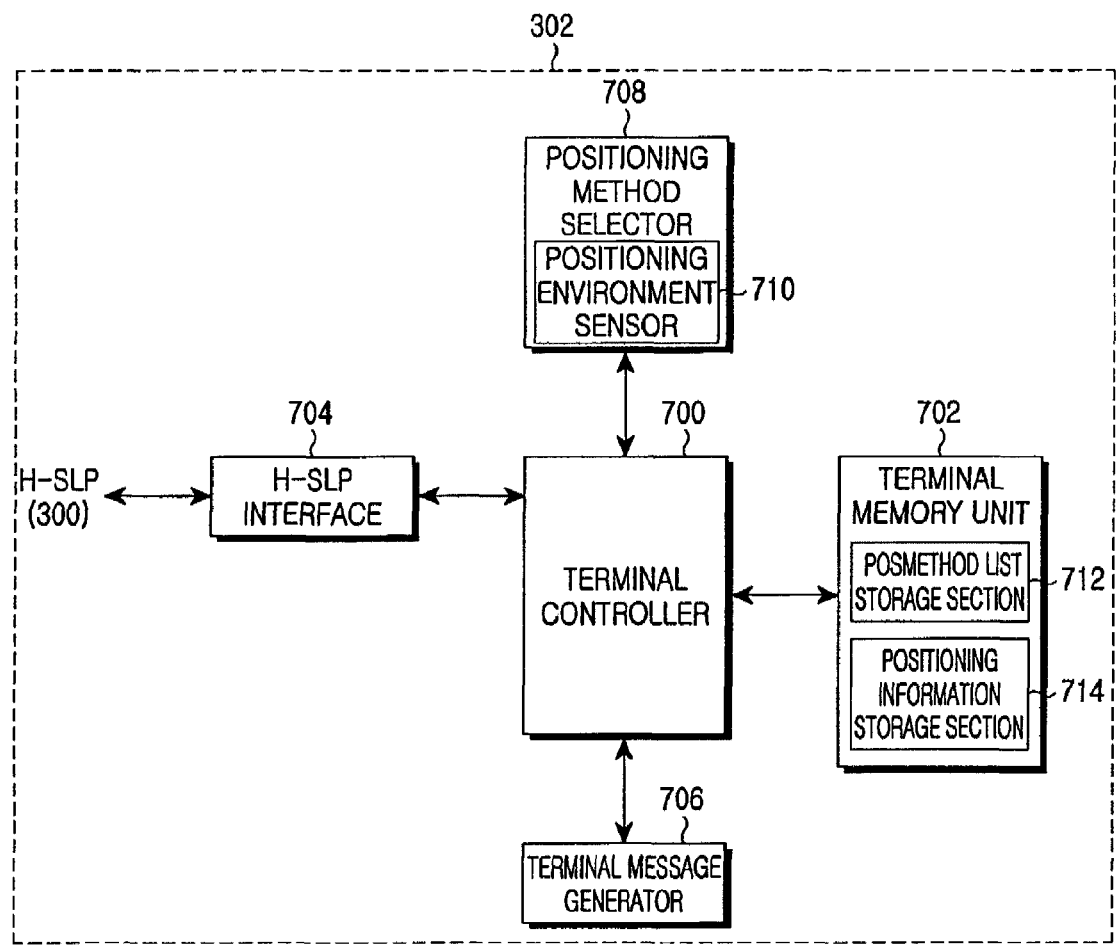
FIG. 7 is a block diagram showing a construction of the target terminal in the location service providing system according to an embodiment of the present invention.

FIG. 7 is a block diagram showing a construction of the target terminal in the location service providing system according to an embodiment of the present invention.

With reference to FIG. 7, the target terminal 302 includes a terminal memory unit 702, a positioning method selector 708, a terminal message generator 706, and an H-SLP interface 704, which are connected to a terminal controller 700. Here, the terminal controller 700 controls respective structural elements of the target terminal 302 and performs a substantial function of the target terminal 302 according to a user's request. When the terminal controller 700 receives a SUPL INIT message for starting the triggered location request service, it includes information about the positioning methods that the target terminal can currently support in the SUPL TRIGGERED RESPONSE message in response to the received SUPL INIT message and transmits it. Further, when the terminal controller 700 receives the POSMETHOD_list including information about positioning methods and priority order information of respective positioning methods that the target terminal 302 can support, it stores the POSMETHOD_list.

Next, the terminal controller 700 checks whether a condition according to the triggered location request service is satisfied. Here, the condition includes a time period set to provide location information of the target terminal expires or a value indicating whether the target terminal reaches a specific position. When the condition is satisfied, the terminal controller 700 loads the stored POSMETHOD_list to extract priority order information of respective positioning methods. Also, the terminal controller 700 selects a positioning method having the highest priority order among the positioning methods, and checks whether a current selected positioning method can be used in its current electric wave environment.

As the result of the check, when the current selected positioning method cannot be used in its current electric wave environment, the terminal controller 700 selects a positioning method having a priority order next to the priority order of the current selected positioning method. Next, the terminal controller 700 again checks whether the current selected positioning method can be used. When the current selected positioning method cannot also be used, the same operation repeats as described above.

Through the repeating operation, when the positioning method being able to be used in a current electric wave environment is selected, the terminal controller 700 transmits information about the current selected positioning method and priority order information thereof to the H-SLP 300. Next, the terminal controller 700 starts a SUPL POS SESSION, which calculates its location according to the current selected positioning method. The SUPL POS SESSION indicates a procedure that the target terminal receives auxiliary location information from the H-SLP 300 and the terminal controller 700 calculates its location. Otherwise, the target terminal 302 provides its location information or auxiliary location information to the H-SLP 300 whereby the H-SLP 300 may calculate a location of the target terminal 302.

Furthermore, the positioning method selector 708 checks whether the positioning methods that the target terminal 302 may support can be used in a current electric wave environment in an order of the priority order set by the H-SLP 300, thereby selecting a positioning method having the highest priority order set by the H-SLP 300 among the positioning methods, which can be used in a current electric wave environment. To do this, the positioning method selector 708 can further include a positioning environment sensor 710.

Here, the positioning environment sensor 710 checks whether the positioning method selected according to the priority order can be used in the current electric wave environment. For example, when the current selected positioning method uses a GPS, the positioning environment sensor 710 checks whether a current received GPS signal has an intensity equal to or greater than a set threshold value. When the current received GPS signal has an intensity less than a set threshold value, the positioning environment sensor 710 informs the positioning method selector 708 that a current electric wave environment of the target terminal 302 is not suited to calculate a location using the GPS.

Accordingly, the positioning method selector 708 selects a positioning method corresponding to a priority order next to a priority order of the current selected positioning method. Further, the positioning method selector 708 checks whether a current selected positioning method can be used using the positioning environment sensor 710. Accordingly, the positioning environment sensor 710 recognizes that the current selected positioning method can be used in a current electric wave environment and informs the terminal controller 700 of this fact. As a result, the target terminal 302 and the H-SLP 300 may calculate a location of the target terminal based on a positioning method having the highest priority order set by the H-SLP 300 among the positioning methods, which can be used in a current electric wave environment of the target terminal 302 and provide location information service to the SUPL AGENT 104.

Furthermore, the H-SLP memory unit 502 connected to the H-SLP controller 500 includes a Read Only Memory (ROM), a flash memory, and a Random Access Memory (RAM). Among them, the ROM stores programs for a processing and a control of the terminal controller 700, and various types of reference data. The RAM provides a working memory of the terminal controller 700. The flash memory provides an area for storing various types of storage data, which can be upgraded. Further, the flash memory can have a storage area for storing POSMETHOD_list received from the H-SLP 300. Hereinafter, the storage area for storing POSMETHOD_list is referred to as 'POSMETHOD_list storage section" 712.

Moreover, the flash memory provides a storage area for storing information about positioning methods and information about an electric wave environment required for respective positioning methods that the target terminal 302 may support. Hereinafter, the information about positioning methods and information about an electric wave environment required for respective positioning methods that the target terminal 302 may support, are referred to as 'positioning information'. The positioning information for respective positioning methods includes information about an electric wave, which can be used for every positioning method.

For example, in a case of the positioning method using the GPS, an intensity of the GPS signal should be greater than a set threshold value in order to calculate a location of the target terminal. Accordingly, in a case of the positioning method using the GPS, the positioning information includes a threshold value of a GPS intensity and information about the GPS signal. Further, in a case of the positioning method using a TDOA, at least three received signals greater than the set signal intensity should be sensed. Accordingly, in the positioning method using the TDOA, the positioning information includes a threshold value of an intensity of a base station signal received from a cell BS and the minimal number of necessary base station signals.

Accordingly, the target terminal 302 can recognize what positioning method the target terminal 302 can support and information about an electric wave environment required in respective positioning methods. A storage area of a terminal memory unit 702 for storing the positioning information is referred to as 'positioning information storage section" 706.

Further, the terminal message generator 706 generates various types of messages to exchange with the H-SLP 300 under a control of the terminal controller 700. The messages include a SUPL POS REPORT message including information about a positioning method suitable to a current electric wave environment through the positioning method selector 708, namely, PRIORITY_INDEX and POSMETHOD about a specific positioning method. Further, the terminal message generator 706 provides various types of messages including the SUPL POS REPORT message to the terminal controller 700.

In addition, the H-SLP interface 704 provides an interface for exchanging various types of messages with the H-SLP 300. Accordingly, various types of messages received from the H-SLP 300 are provided to the terminal controller 700, or various types of messages according to a control of the terminal controller 700 are transmitted to the H-SLP 300.

Figure 8:
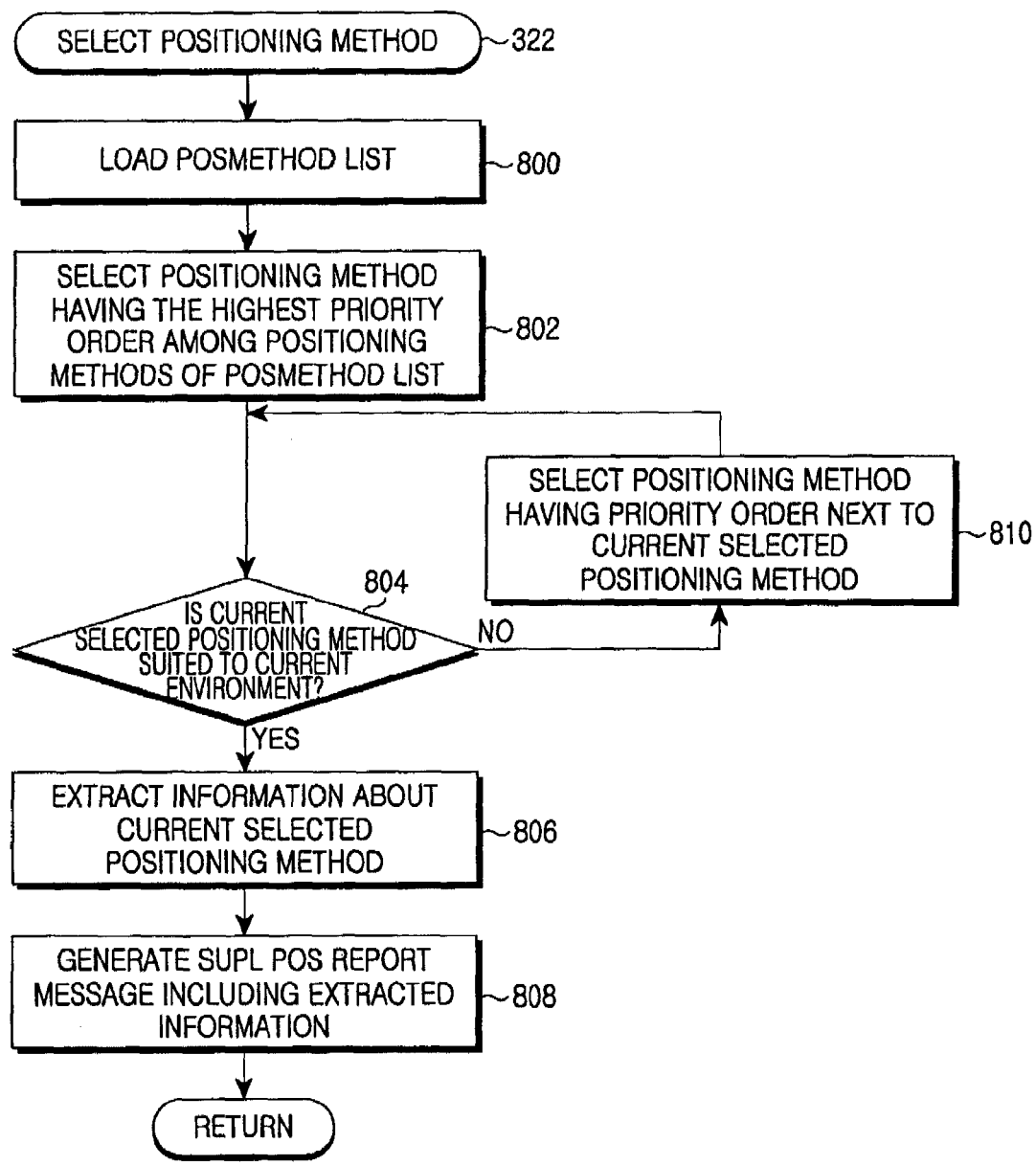
FIG. 8 is a flow chart showing an operation of selecting a suitable positioning method by a target terminal when the target terminal receives POSMETHOD_list in the location service providing system according to an embodiment of the present invention.

FIG. 8 is a flow chart showing an operation of selecting a suitable positioning method by a target terminal when the target terminal 302 receives POSMETHOD_list in the location service providing system according to an embodiment of the present invention.

Referring to FIG. 8, when a condition set for providing the triggered location request service is satisfied, the target terminal 302 goes to Step 800 and loads POSMETHOD_list information provided from the H-SLP 300 from the POSMETHOD_list storage section 712. Next, the target terminal 302 goes to Step 802 and selects a positioning method having the highest priority order among positioning methods of the POSMETHOD_list loaded in Step 800.

Then, the target terminal 302 goes to Step 804 and loads positioning information corresponding to a current selected positioning method, namely, information about an electric wave environment of the current selected positioning method from the positioning information storage section 712. Further, the target terminal 302 judges whether the current selected positioning method is suited to a current electric wave environment according to the loaded positioning information.

As a result of the judgment in Step 804, when the selected positioning method can be used in a current electric wave environment of the target terminal 302, the target terminal 302 goes to Step 806 and extracts information about the current selected positioning method from the POSMETHOD_list. Extracting information of the target terminal 302 includes a priority order PRIORITY_INDEX of the selected positioning method and information POSMETHOD including various types of parameters of the selected positioning method as shown in FIG. 2. Subsequently, the target terminal 302 goes to Step 808 and generates a SUPL POS REPORT message including the extracted information.

However, when it is judged that the current selected positioning method is not suited to a current electric wave environment according to loaded positioning information in Step 804, the target terminal 302 goes to Step 810 and selects a positioning method having a next highest priority to a priority order according to the current selected positioning method. Moreover, the target terminal 302 goes to Step 804 and loads positioning information corresponding to a current selected positioning method, namely, information about an electric wave environment of the current selected positioning method from the positioning information storage section 706. Further, the target terminal 302 judges whether the current selected positioning method is suited to a current electric wave environment according to the loaded positioning information. According to the judgment result, the target terminal 302 goes to Step 806 or Step 810 and searches for a positioning method being able to be used in the current electric wave environment in an order of the priority order set in the POSMETHOD_list. Accordingly, when a condition according to the triggered location request service is satisfied, the present invention provides location information of the target terminal 302 to the SUPL AGENT 104 through the positioning method according to the current electric wave environment. Therefore, the present invention can provide a more reliable triggered location request service.

Furthermore, the embodiment of the present invention has been described that the H-SLP 300 sets a priority order in positioning methods of the target terminal 302 and transmits them to the target terminal 302 according the set priority order. However, the H-SLP 300 can transmit positioning methods, a priority order of which is not set to the target terminal 302. In this case, the target terminal 302 may select at least one among positioning methods included in the POSMETHOD_list being able to be used in a current environment, and provide information about at least one selected positioning method to the H-SLP 300. In the case, the H-SLP 300 can select any one of the at least one positioning method received from the target terminal 302 according to the aforementioned set condition, namely, a service provider's management policy, cost preference, and taxable policy, and can calculate a location of the target terminal 302 according to the selected positioning method. This is a second embodiment of the present invention.

Figure 9:
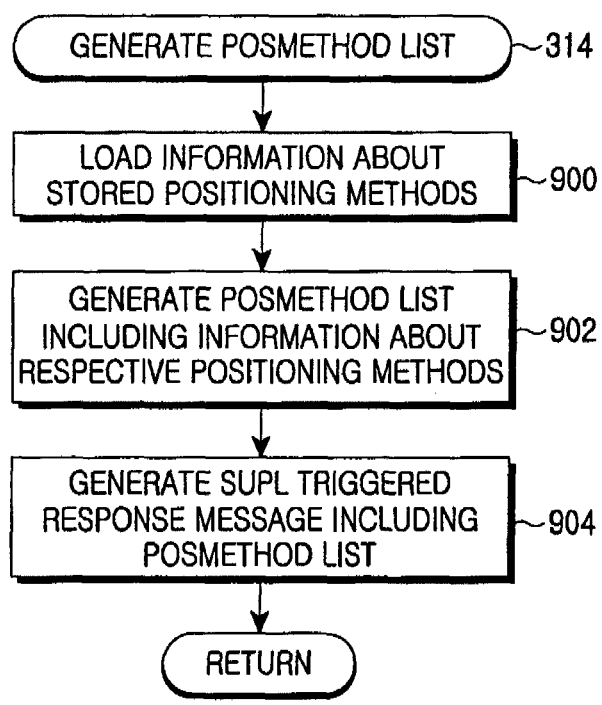
FIG. 9 is a flow chart showing an operation of generating POSMETHOD_list by the H-SLP in the location service providing system according to a second embodiment of the present invention.

FIG. 9 is a flow chart showing an operation of generating POSMETHOD_list by the H-SLP 300 in the location service providing system according to a second embodiment of the present invention. In a following explanation, it is assumed that the H-SLP controller 500 generates and includes information about at least one positioning method in a list pattern, namely, POSMETHOD_list in a SUPL TRIGGERED RESPONSE message.

With reference to FIG. 9, when an H-SLP 300 of a location service providing system according to a second embodiment of the present invention receives a SUPL TRIGGERED START message from the target terminal 302, it goes to Step 900 and extracts information about positioning methods from the received SUPL TRIGGEREND START message. Next, the H-SLP 300 goes to Step 902 and generates the POSMETHOD_list including information about positioning methods extracted in Step 900. The POSMETHOD_list includes information (various types of parameters, description or value, for example, types of networks (CDMA, WLAN, WCDMA, GSM, WiMAX), and types of signals (WLAN AP ID, an intensity of AP signal, cell ID, an intensity of signal from a base station to a terminal, an intensity of signal from the terminal to the base station, and etc.) required to the terminal for every network) about positioning methods that the target terminal 302 may support.

Next, the H-SLP 300 goes to Step 904 and generates a SUPL TRIGGERED RESPONSE message including the POSMETHOD_list through the H-SLP message generator 510. Accordingly, the H-SLP 300 goes to Step 316 of FIG. 3 and transmits the SUPL TRIGGERED RESPONSE message having the POSMETHOD_list to the target terminal 302. The H-SLP 300 stores a selected POSMETHOD_list and can reuse it during a triggered service at need. Accordingly, the target terminal 302 can receive information about at least one positioning method, a priority order of which is not set through the SUPL TRIGGEREND RESPONSET message from the H-SLP 300. The target terminal 302 stores a selected POSMETHOD_list and can reuse it during a triggered service at need.

Accordingly, in this case, the H-SLP 300 transmits an MLP TLRA message to a service requester, namely, the SUPL AGENT 104 and informs it that the requested service starts as shown in Step 318 of FIG. 3.

On the other hand, the target terminal 302 receives POSMETHOD_list including at least one positioning method the priority order of which is not set, in the second embodiment of the present invention. Further, the target terminal 302 judges whether at least one positioning method is suited to a current electric wave environment. Moreover, the target terminal 302 checks at least one positioning method among the positioning methods included in the POSMETHOD_list, which is suited to the current electric wave environment. Further, the target terminal 302 generates and transmits a SUPL POS REPORT message including information about this to the H-SLP 300.

Figure 10:
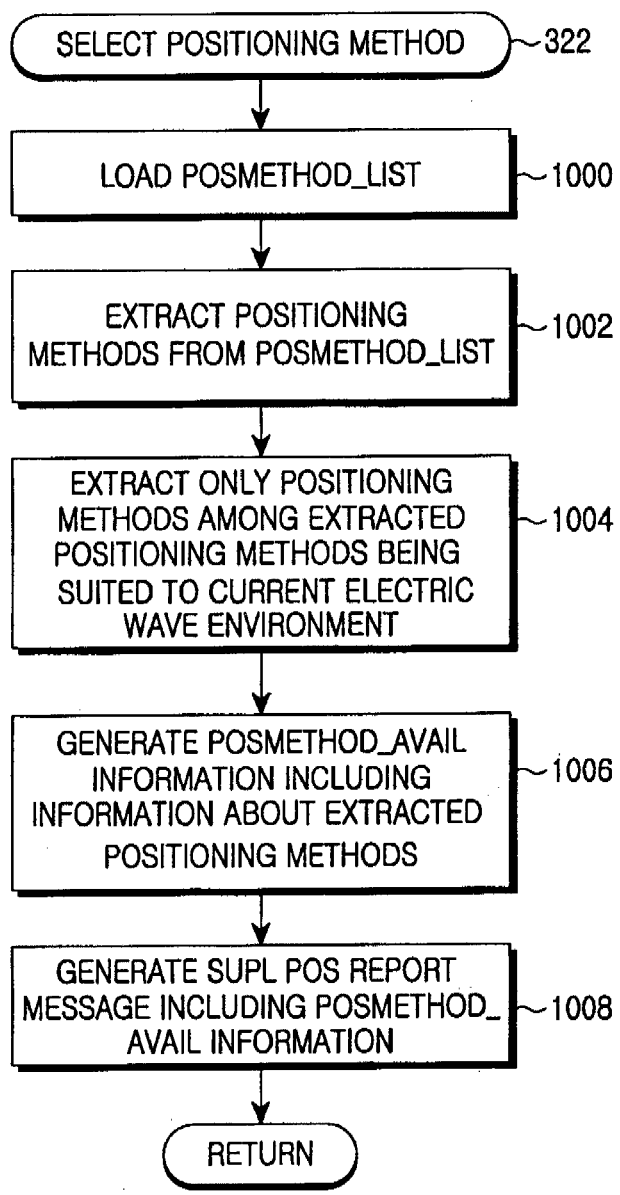
FIG. 10 is a flow chart showing an operation of selecting a positioning method included in POSMETHOD_list received from the H-SLP by the target terminal in the location service providing system according to a second embodiment of the present invention.

FIG. 10 is a flow chart showing an operation of selecting a positioning method included in POSMETHOD_list received from the H-SLP by the target terminal 302 in the location service providing system according to the second embodiment of the present invention.

With reference to FIG. 10, when a condition (for example, an expiration of a set reserved time) for providing the triggered location request service is satisfied, the target terminal 302 according to the second embodiment of the present invention goes to Step 1000 and loads POSMETHOD_list information provided from the H-SLP 300 from the POSMETHOD_list storage section 712. Next, the target terminal 302 goes to Step 1002 and extracts information about at least one positioning method included in the POSMETHOD_list. In Step 1004, the target terminal 302 selects only positioning methods among the extracted positioning methods that are suited to a current electric wave environment. As illustrated earlier, a step of selecting the positioning methods suited to a current electric wave environment may be a step of selecting only positioning methods, which can be used in the current electric wave environment, that is, a current environment of a network in which data for calculating a location of the target terminal 302 are exchanged.

Then, the target terminal 302 goes to Step 1006, and includes information about at least one positioning method selected since it is suited to the current electric wave environment in Step 1004, in the POSMETHOD_avail information. Here, the POSMETHOD_avail information is used when the target terminal 302 informs the H-SLP 300 of information (for example, types (WLAN, WiMAX, or CDMA) of networks capable of currently receiving a signal or whether AGPS is used) about current available positioning methods.

In Step 1006, when information about positioning methods, which is able to be used in a current electric wave environment in the POSMETHOD_avail information, the target terminal 302 goes to Step 1008 and generates a SUPL POS REPORT message including the POSMETHOD_avail information. Subsequently, the target terminal 302 goes to Step 324 and transmits the SUPL POS REPORT message including the POSMETHOD_avail information to the H-SLP 300.

Accordingly, the H-SLP 300 according to the second embodiment of the present invention receives the POSMETHOD_avail information from the target terminal 302 through the SUPL POS REPORT message. Accordingly, the H-SLP 300 selects any one from at least one positioning method included in the POSMETHOD_avail information, and starts a location calculation with the target terminal 302 according thereto. In this case, after the triggered location request service starts, although an electric wave environment of the target terminal 302 is not changed, the second embodiment of the present invention has an advantage in that it can use a positioning method that a user prefer to according to an enterpriser's management policy and taxable policy. Here, the enterpriser provides location information in a current state.

For example, in the first embodiment of the present invention, a positioning method that the enterpriser preferentially sets is selected from positioning methods suited to an electric wave environment of the target terminal 300. Consequently, although an enterpriser's preference policy is changed, a positioning method could not be selected according to the enterpriser's selection except for a case where a priority order of the positioning methods included in the POSMETHOD_list is not changed. However, in the second embodiment of the present illustrated above, at least one positioning method that the target terminal 302 can currently support is provided to the H-SLP 300. Accordingly, although an electric wave environment of the target terminal 302 has not been changed, the positioning method can be changed according to an enterpriser's selection. Consequently, in this case, the enterpriser can effectively use a location information system.

Accordingly, although the target terminal changes to an electric wave during the triggered location request service and cannot use the previously determined positioning method, the present invention can continuously provide the triggered location request service. This causes a more reliable triggered location request service to be provided.

In particular, the present invention has been described where positioning methods using GPS and TDOA are explained as an embodiment. However, other positioning methods can be used.

Furthermore, in the embodiment of the present invention, although a proxy mode or a non-roaming case in a network-initiated manner is described, a set initiated manner is applicable. Here, in the network initiated manner, a location service requester SUPL AGENT is positioned at a network and provides a location service of a target terminal according to a location service providing request from the network. In contrast to this, in the set initiated manner, a location service is provided through a location server according a location service providing request from the target terminal.

In addition, since the present invention has been described in the non-roaming cast manner, the H-SLP is used as the location server. However, in the roaming case, a method that the location server and the target terminal provide a location service in a predetermined positioning method is similar to that of the non-roaming case. Accordingly, the present invention is applicable to the roaming case. In this case, a visited-SLP can be used as the location server.

Moreover, since the present invention has been explained that it operates in a proxy mode, the H-SLP is used as the location server. A method that the location server and the target terminal provide a location service in a predetermined positioning method is similar to that of the non-roaming case. Accordingly, the present invention is applicable to the roaming case. In this case, a Home-SUPL Location Center (H-SLC) is used as the location server.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A location server for providing a location information service to a terminal comprising:
   an interface for receiving and transmitting messages from/to a target terminal;
   a location server memory unit for storing priority order set condition information which is set according to a service provider's policy or a user's selection to calculate a current location of the target terminal; and
   a location server controller for:
   transmitting an initial location service request message to the target terminal;
   receiving a location information providing service start message as response to the initial location service request message from the target terminal, the location information providing service start message including information with respect to positioning methods that the target terminal supports;
   generating a priority order list including information of the positioning methods received from the target terminal and priority order information corresponding to the received positioning methods, wherein the priority order list is generated by comparing the priority order set condition information with the location information providing service start message received from the target terminal, and setting a priority order with respect to the received positioning methods;
   transmitting a location information providing service response message including the priority order list to the target terminal by the location server; and
   receiving information with respect to a specific positioning method from the target terminal, the specific positioning method being selected by the target terminal from the positioning methods in the location information providing service response message based on a condition of the target terminal.

2. The location server according to claim 1, wherein the location server controller selects at least one of the positioning methods received from the target terminal according to at least one of a providing possibility, the service provider's preference, or the service provider's policy.

3. The location server according to claim 1, wherein the priority order set condition is a condition with respect to a plurality of positioning methods having a priority order of which is previously set by a selection of an administrator of the location server, the service provider, or the user.

4. The location server according to claim 1, wherein the location server either directly calculates the location of the target terminal using the specific positioning method selected by the target terminal or provides auxiliary location information for calculating the current location to the target terminal so that the target terminal calculates the current location itself.

5. The location server according to claim 1, wherein the priority order list is a list in which the information of the positioning methods is arranged according to the priority order.

6. The location server according to claim 1, wherein the location server is a home-secure user plane location platform or a visited-secure user plane location platform.

7. The location server according to claim 1, wherein the location server is a home-secure user plane location platform or a home-secure user plane location center.

8. A target terminal for providing a location information service comprising:
   an interface for transmitting and receiving a message to/from a location server;
   a memory unit for storing information on at least one positioning method that the target terminal supports and information on at least one positioning method that the location server supports;
   a selector for selecting a specific positioning method that exists in both the at least one positioning method that the target terminal supports and the at least one positioning method that the location server supports, from a list received from the location server, based on a condition of the target terminal;
   a message generator for generating messages to be transmitted to the location server including a first message including the at least one positioning method that the target terminal supports, and a second message including information of the specific positioning method; and
   a controller for controlling the selector to select the specific positioning method from among the at least one positioning method that the target terminal and the location server support, from the list received from the location server,
   wherein the list includes information of the at least one positioning method that the target terminal supports and priority order information corresponding to the at least one positioning method that the target terminal supports, and wherein the list is generated at the location server by comparing priority order set condition information, which is set according to a service provider's policy or a user's selection to calculate a current location of the target terminal, with the first message, and setting a priority order with respect to the at least one positioning method that the target terminal supports.

9. The method according to claim 1, wherein the location information service provides current location information of the target terminal according to whether a time period set to provide location information of the target terminal expires or the target terminal reaches a specific position.

10. The target terminal according to claim 8, wherein the selector includes a location calculation environment sensor for checking a current electric wave environment and for determining whether the at least one positioning method can be used according to an electric wave environment sensing result of the location calculation environment sensor.

11. The target terminal according to claim 8, wherein the controller calculates the current location itself using the specific positioning method when auxiliary location information is received from the location server after the controller transmits the specific positioning method to the location server for providing a location service.

12. A method for providing a location information providing service to a terminal, the method comprising the steps of:
(i) transmitting an initial location service request message to a target terminal by a location server;
(ii) receiving, by the location server, a location information providing service start message as response to the initial location service request message from the target terminal, the location information providing service start message including information with respect to positioning methods that the target terminal supports;
(iii) generating a priority order list including information of the positioning methods received from the target terminal and priority order information corresponding to the received positioning methods, wherein the priority order list is generated by comparing priority order set condition information, which is set according to a service provider's policy or a user's selection to calculate a current location of the target terminal, with the location information providing service start message, and setting a priority order with respect to the received positioning methods;
(iv) transmitting a location information providing service response message including the priority order list to the target terminal by the location server; and
(v) receiving, by the location server, information with respect to a specific positioning method from the target terminal, the specific positioning method being selected by the target terminal from the positioning methods in the location information providing service response message based on a condition of the target terminal.

13. The target terminal according to claim 8, wherein the memory unit stores a priority order of the information on the at least one positioning method that the location server supports.

14. The method according to claim 12, wherein the target terminal requests the location information providing service.

15. The method according to claim 12, wherein step (iii) includes:
extracting the information of the positioning methods from the location information providing service start message received from the target terminal by the location server; and
loading the priority order set condition information stored in a memory unit of the location server by the location server.

16. The method according to claim 12, wherein step (iii) includes:
selecting at least one of the received positioning methods for inclusion in the priority order list according to any one of a providing possibility, an enterpriser's preference, or an enterpriser's policy.

17. The method according to claim 12, wherein the location information is provided according to whether a time period set to provide location information of the target terminal expires or the target terminal reaches a specific position.

18. The method according to claim 12, wherein the location server is a home-secure user plane location platform or a visited-secure user plane location platform.

19. The method according to claim 12, wherein the location server is a home-secure user plane location platform or a home-secure user plane location center.

* * * * *